Patented Jan. 27, 1942

2,271,127

UNITED STATES PATENT OFFICE 2,271,127

PHOSPHATIDIC COMPOUNDS

Morris Mattikow, New York, N. Y., assignor to Refining, Inc., Reno, Nev., a corporation of Nevada No Drawing. Application June 29, 1939,
Serial No. 281,936

24 Claims. (Cl. 260—403)

This invention relates to phosphatidic compounds, and more particularly to addition and hydroxylated phosphatidic compounds.

An object of the present invention is to provide new phosphatidic compounds.

Another object of the invention is to provide new phosphatidic materials having greater stability against deterioration than the original phosphatides.

Another object of the invention is to provide new phosphatidic materials which are less acidic in nature than the original phosphatidic materials.

Another object of the invention is to provide phosphatidic materials which are more easily dispersible in water than the original phosphatidic materials.

Another object of the invention is to provide phosphatidic materials having improved emulsifying properties over the original phosphatidic materials.

Another object of the invention is to provide phosphatidic materials having improved water retention properties over the original materials.

Another object of the invention is to provide a process of forming new addition compounds of phosphatides.

Another object of the invention is to provide a process of producing phosphatidic addition compounds with substances having free hydroxy groups.

Another object of the invention is to provide a process of producing phosphatidic addition compounds with glycerine, which compounds are soluble in petroleum ether.

Another object of the invention is to provide a method of producing hydroxylated phosphatidic compounds.

Another object of the invention is to provide new addition compounds of phosphatides.

Another object of the invention is to provide a phosphatidic addition compound with substances having free hydroxy groups.

A further object of the invention is to provide phosphatidic addition compounds with glycerine which are soluble in petroleum ether.

A still further object of the invention is to provide hydroxylated phosphatidic compounds.

Other objects and advantages of the invention will appear in the following description of the invention.

The compounds of the present invention may be prepared from any of the various types of phosphatides or phosphatidic materials, for example, vegetable phosphatidic material. Such vegetable phosphatidic material is ordinarily predominantly of the cephalin type but may also contain phosphatides of the lecithin type. In general, a phosphatide molecule is made up of a glycerol radical, two fatty acid radicals and a phosphatidic radical. It has been found possible to add substances containing free hydroxy groups to the phosphatide molecule so as to form addition compounds. Furthermore, in accordance with the present invention, one or more of the fatty acid radicals of the phosphatide molecule can be removed to produce hydroxylated compounds.

Although substances containing free hydroxy groups can, in general, be employed in the present invention with either crude or purified phosphatidic material, the invention will first be described with reference to the employment of glycerine as the reacting substances with purified vegetable phosphatidic material. Vegetable phosphatidic material occurs in various seeds and can be recovered therefrom by several procedures. Crude vegetable oils are an excellent source of vegetable phosphatides. The phosphatidic material, along with various other materials, may be precipitated with water or electrolytes and centrifugally or otherwise separated from the oil. The crude phosphatidic material or gums may be treated to recover purified phosphatides by the following steps. The water may first be evaporated from the gums in vacuo, preferably at relatively low temperatures. The dry material may then be treated with a solvent for phosphatides, for example, hydrocarbon solvents such as hexane, petroleum ether, benzol, etc., to dissolve the phosphatides. The mixture may then be separated by centrifugal separation, decantation or filtration. The insoluble residue contains meal, inorganic salts, proteins, resins, carbohydrates, etc., and, for the purpose of the present invention, can be discarded. Acetone may then be added to the solution to precipitate the phosphatides which may be separated from the solution by decantation, filtration or centrifugal separation. The residue may be repeatedly washed with acetone to remove non-phosphatidic materials. Any residual acetone may then be evaporated to produce substantially pure phosphatidic material. Phosphatides from other sources than crude vegetable oil can likewise be purified in substantially the same manner.

By way of example, purified corn phosphatides obtained from crude corn oil as above contain approximately from 1.2% to 1.5% nitrogen, from 2.9% to 3.5% phosphorus, and have an iodine number varying from 40 to 80. In making the improved addition compounds of the present invention, 20 parts by weight of the purified vegetable phosphatides, for example purified corn phosphatides, may be admixed with 20 parts glycerine and 1 part catalyst, for example trisodium phosphate. This material may be heated by indirect heat exchange with a heating medium such as heated mineral oil or steam for ¼ to 6 hours at a temperature of 200 to 320° F. The preferred temperatures, however, range between 260 and 320° F. and a temperature of 300° F. is usually employed. The mixture is preferably stirred during heating and maintained under a blanket of inert gas, for example nitrogen. The resulting material may then be cooled to approximately room temperature and treated with a phosphatide solvent such as petroleum ether or hexane. Any residue consisting of uncombined glycerine, catalyst, etc., may be separated from the phosphatide solution and discarded. The phosphatides may then be precipitated with acetone and separated from the solution to recover the new phosphatidic addition compound of the present invention. After the residual acetone or solvent has been evaporated, the product contains decreased percentages of nitrogen and phosphorus and has a lower iodine number, but the ratio of nitrogen to phosphorus remains substantially unchanged, showing that glycerine has combined with the phosphatide molecule. The amount of glycerine combined in this addition compound will range from 5% to 50%, or even higher.

As a specific example of making the addition compound, corn phosphatidic material, purified as described above, and containing 1.3% nitrogen, 3.0 phosphorus and having an iodine number of 75, was heated with glycerine and catalyst as above described for one hour at 300° F. and further purified as also above described. The resulting product contained 1% nitrogen, 2.44% phosphorus, and had an iodine number of 56. This addition compound was a clear light amber paste soluble in oil and readily dispersible in water to give a stable solution. This compound is clearly not a mixture or mechanical dispersion, as the material dissolves in hexane or petroleum ether to form a perfectly clear solution. As glycerine is insoluble in these solvents, this would not be the case if free glycerine were present. No glycerine can be freed from the compound by ordinary means. It is also clear that a fatty acid radical has not been removed from the molecule, as this would increase rather than decrease the nitrogen and phosphorus content.

The addition compound differs in its properties from the original purified phosphatides in that it does not oxidize and darken when exposed to the air. It is more easily dispersible in water, and greater quantities may be dispersed in water than the original purified material. Also, the addition compound has greater emulsifying power between oil and water than the original phosphatidic material, as determined by the standard test of emulsifying 15 parts of a ½% solution of the emulsifying agent in oil with 20 parts of water.

If the heating in the above process is carried on at higher temperatures or for longer periods of time, or both, the phosphatidic compound is modified to form a hydroxylated compound. For example, by increasing the heat up to 400° F. and preferably around 385° F. for ½ to 6 hours, such compound is produced. Both the reaction producing the addition compound and the reaction producing the hydroxylated compound are functions of time and temperature, the amount and kind of catalyst, and the proportions of reacting material, as well as the type of phosphatidic material being treated. The conditions of time, temperature, proportions and amount and nature of catalyst will vary widely, depending upon the nature of the phosphatides being treated and the product desired. By changing the conditions during reaction, various intermediate compounds between the original phosphatidic material and the addition compound, and between the addition compound and the hydroxylated compound, may be obtained.

As a specific example of making the hydroxylated compound, another sample of purified corn phosphatide referred to was heated with glycerine and catalyst in the proportions given, at a temperature of 385° F. for one hour. A hydroxylated compound was obtained which, when purified by solution in a solvent therefor and precipitated with acetone, contained 5.6% phosphorus, 2.6% nitrogen, and had an iodine number of 35. This iodine number would probably have been higher if the sample had been analyzed before substantial contact with oxygen. The ratio of phosphorus to nitrogen again remained practically constant, which, together with the increased percentages of phosphorus and nitrogen, shows removal of a fatty acid radical from the phosphatide molecule. The resulting purified product was a grayish white powder completely soluble in oil and readily dispersible in water. In fact, this compound appears to be partly soluble in water but is not quite as dispersible therein as the addition compound. It is an extremely good emulsifier for oil and water as determined by the above described test, and is less acidic than the original purified phosphatidic material. In general, however, a somewhat better yield of the addition compound is obtained than of the hydroxylated compound.

Other phosphatidic material including animal phosphatides may be treated as above to produce either addition or hydroylated compounds. The preferred material is, however, vegetable phosphatidic material containing no fatty acid radicals of higher unsaturation than linoleic. Soya bean and other phosphatides, which contain linolenic acid, tend to decompose at higher temperatures and are difficult to react without destruction. However, by heating for extended periods of time at temperatures in the lower portion of the ranges given, either of the two compounds may be produced from soya bean phosphatides without substantial destruction thereof. Other examples of vegetable phosphatides which are readily convertible into the new phosphatidic compounds are peanut, rapeseed, sunflower, sesame or cottonseed.

As another specific example, 20 parts of cottonseed phosphatides purified as above described, were heated with 20 parts of glycerine in the presence of 1 part of diphenyl guanidine for 30 minutes at 300° F. in order to form an addition compound. The original purified cottonseed phosphatides contained 1.2% nitrogen, 2.8% phosphorus, and had an iodine number of 70. The purified addition compound contained 0.7% nitrogen, 1.7% phosphorus, and had an iodine number of 42. Continued heating of the mixture at 385° F. for an additional 30 minutes produced a hydroxylated compound which, when purified, contained 2.2% nitrogen, 4.9% phosphorus, and had an iodine number of 40. The purified addition compound was a cherry red paste having properties similar to the corn phosphatide addition compound. The purified hydroxylated compound was a yellowish powder having similar properties to the corn phosphatide hydroxylated compound. The diphenyl guanidine will, however, render the material inedible unless carefully removed therefrom, although either of the cottonseed phosphatidic compounds may be employed for various purposes if a portion of the diphenyl guanidine remains therein.

Instead of first purifying crude phosphatides such as those separated from crude vegetable oils, the crude phosphatides may be treated directly; for example, the crude phosphatides may be dried in vacuo and then mixed with glycerine and catalyst in substantially the same proportions as for the purified phosphatidic material and heated under substantially the same conditions to form an addition compound between the phosphatides and glycerine. If the resulting addition compound is purified by dissolving out the phosphatidic material with a solvent therefor, separating the residue and precipitating the phosphatidic material from the solution with acetone, it is found to have substantially the same properties as that prepared from the purified phosphatidic material. The same is true if the crude dried phosphatidic material is employed to make the hydroxylated compound. That is, the purified hydroxylated compound has substantially the same properties as the hydroxylated compound made from the original purified phosphatidic material.

For many purposes, however, the crude phosphatidic compounds of the present invention may be employed directly without purification or they may be partially purified by treatment with solvents, omitting the acetone precipitation step.

Other substances containing free hydroxy or alcohol groups may be substituted for glycerine in the above process. For example, mono or di esters of glycerine such as mono- or diglycerides of fatty acids, or other radicals which combine with glycerine, may be employed. Other polyhydroxy alcohols or esters thereof which contain 1 or more free hydroxy groups, for example glycol or mono esters thereof such as mono esters with fatty acids, may be employed. Furthermore, sugars such as sorbitol or mannitol form addition or hydroxy compounds with phosphatides. Other higher alcohols may also be employed, and even the lower aliphatic alcohols, for example ethyl alcohol, may be caused to form addition or hydroxylated compounds, particularly if the reaction is carried on under pressure to prevent evaporation of the alcohol. Many of the compounds with higher alcohols are not water-soluble, although the compounds with the lower aliphatic alcohols are water-soluble. Many other substances having free hydroxy groups, for example gluconic acid, also form such addition and hydroxylated compounds. In general, substances which have free hydroxy groups and react like alcohols, i. e. which form esters with organic acids, form compounds in accordance with the present invention.

In general, any basic material may be employed as a catalyst in the above reaction. Thus, in addition to the sodium triphosphate and diphenyl guanidine given in the above examples, such materials as selenium, triethanolamine and hydroxides or alkali salts of alkali metals or alkaline earth metals may be employed. In general, the more basic the catalyst the less the amount which will be employed. Thus, depending upon the type of catalyst and the type of phosphatide being treated, the amounts of catalyst will vary between approximately $\frac{1}{10}$ of 1% and 5%.

The phosphatidic compounds of the present invention or mixtures thereof are soluble in oil and are useful in many arts as emulsifying agents, as additions to food products to increase their water-retention and compatibility with sugar, and, in general, for the various uses for which vegetable phosphatides are employed in the copending application of Benjamin H. Thurman Serial No. 288,685, filed August 5, 1939, now Patent No. 2,201,064, granted May 14, 1940. The phosphatidic compounds of the present invention are, in general, more effective than the original phosphatides.

While preferred embodiments of the invention have been described, it is understood that the details thereof may be varied within the scope of the following claims.

I claim:

1. A process of producing new phosphatidic compounds, which comprises, heating phosphatidic material with a compound having a free hydroxy group in the presence of a basic material as a catalyst.

2. The process of producing addition compounds of phosphatides, which comprises, heating phosphatic material with a compound having a free hydroxy group in the presence of a basic material as a catalyst for sufficient time and at a sufficient temperature to cause substantial combination between the phosphatides and the compound having a free hydroxy group.

3. The process of producing mixtures of addition compounds of phosphatides and hydroxylated phosphatidic compounds, which comprises, heating phosphatidic material with a compound having a free hydroxy group in the presence of a basic material as a catalyst for sufficient time and at a sufficient temperature to cause substantial combination between the phosphatides and a compound having a free hydroxy group and to cause the removal of a fatty acid radical from a portion of the phosphatide molecule.

4. The process of producing hydroxylated phosphatidic compounds, which comprises, heating phosphatidic material with a compound having a free hydroxy group in the presence of a basic material as a catalyst for sufficient time and at a sufficient temperature to cause a substantial combination between the phosphatides of the phosphatidic material and the compound having the free hydroxy group and continuing the heating at a temperature sufficient to cause the removal of at least one fatty acid radical from a substantial portion of the phosphatide molecules.

5. The process of producing hydroxylated phosphatidic compounds which comprises, heating a phosphatidic material with a compound having a free hydroxy group in the presence of a basic material as a catalyst for sufficient time and at a sufficient temperature to cause the removal of at least one fatty acid radical from a substantial portion of the phosphatide molecules.

6. The process of producing new phosphatidic compounds which comprises heating phosphatidic material with a compound having a free hydroxy group in the presence of a basic material as a catalyst at a temperature between 200 and 400° F.

7. The process of producing addition compounds with phosphatides, which comprises, heating phosphatidic material with a compound having a free hydroxy group in the presence of a basic material as a catalyst at a temperature between 200 and 320° F. for sufficient time to cause substantial combination between the phosphatides and the compound having a free hydroxy group.

8. The process of producing hydroxylated phosphatidic compounds, which comprises, heating phosphatidic material with a compound having a free hydroxy group in the presence of a basic material as a catalyst at a temperature between 200 and 400° F. for sufficient time to cause at least one fatty acid radical to be removed from a substantial portion of the phosphatide molecules.

9. The process of producing hydroxylated phosphatidic compounds, which comprises, heating phosphatidic material with a compound having a free hydroxy group in the presence of a basic material as a catalyst at a temperature between 320 and 400° F. for a time between one-half and six hours.

10. The process of producing addition compounds of phosphatides, which comprises, heating phosphatidic material with a compound having a free hydroxy group in the presence of a basic material as a catalyst at a temperature between 200 and 320° F. for a time between one-quarter and six hours.

11. The process of producing new phosphatidic compounds, which comprises, heating phosphatidic material with an alcohol in the presence of a basic material as a catalyst.

12. The process of producing new phosphatidic material, which comprises, heating phosphatidic material with a polyhydroxy alcohol in the presence of a basic material as a catalyst.

13. The process of producing new phosphatidic compounds, which comprises, heating phosphatidic material with glycerine in the presence of a basic material as a catalyst.

14. The process of producing new phosphatidic compounds, which comprises, heating phosphatidic material with a partial glycerol ester of a fatty acid in the presence of a basic material as a catalyst.

15. The process of producing new phosphatidic compounds, which comprises, heating phosphatidic material with a monoglyceride of a fatty acid in the presence of a basic material as a catalyst.

16. The process of producing new phosphatidic compounds, which comprises, heating phosphatidic material with a sugar having at least one free hydroxy group in the presence of a basic material as a catalyst.

17. As a product of manufacture, a new phosphatidic compound having an alcohol radical attached to the phosphatide molecule, said compound being soluble in petroleum ether.

18. As a product of manufacture, a new phosphatidic compound having a polyhydroxy alcohol radical attached to the phosphatide molecule, said compound being soluble in petroleum ether.

19. As a product of manufacture, a new phosphatidic compound in which a glycerine radical is attached to the phosphatide molecule, said compound being soluble in petroleum ether.

20. As a product of manufacture, a new phosphatidic compound in which a partial glycerol ester of a fatty acid is chemically attached to the phosphatide molecule, said compound being soluble in petroleum ether.

21. As a product of manufacture, a hydroxylated phosphatide having a phosphatidic radical and not more than one fatty acid radical attached to the glycerine radical of the phosphatide molecule, said compound being soluble in petroleum ether.

22. As a product of manufacture, a mixture of addition and hydroxylated phosphatidic compounds comprising an addition compound in which a compound having a free hydroxy group is attached to the phosphatide molecule in admixture with a compound in which at least one fatty acid radical has been removed from the phosphatide molecule, said compounds being soluble in petroleum ether.

23. As a product of manufacture, a new phosphatidic compound, which comprises, a compound having a free hydroxy group attached to the phosphatide molecule, said compound being soluble n petroleum ether.

24. A process of producing new phosphatidic compounds, which comprises, heating phosphatidic material with a compound having a free hydroxy group to a temperature between 260° and 400° F. for sufficient time to cause substantial combination reaction between the phosphatidic material and said compound.

MORRIS MATTIKOW.

CERTIFICATE OF CORRECTION.

Patent No. 2,271,127.  January 27, 1942.

MORRIS MATTIKOW.

It is hereby certified that error appears in the printed specification of the above numbered patent requiring correction as follows: Page 3, second column, line 31, claim 2, for "phosphatic" read --phosphatidic--; page 4, second column, line 44, claim 23, for "n" read --in--; and that the said Letters Patent should be read with this correction therein that the same may conform to the record of the case in the Patent Office.

Signed and sealed this 24th day of March, A. D. 1942.

(Seal)  Henry Van Arsdale,
Acting Commissioner of Patents.